(12) United States Patent
Lee et al.

(10) Patent No.: US 9,290,091 B2
(45) Date of Patent: Mar. 22, 2016

(54) MODULARIZED STRUCTURE OF FUEL DEVICE AND REAR SUSPENSION

(71) Applicants: Hyundai Motor Company, Seoul (KR); Kia Motors Corporation, Seoul (KR)

(72) Inventors: Seung-Hak Lee, Whasung-Si (KR); Young-Gun Cho, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/536,560

(22) Filed: Nov. 7, 2014

(65) Prior Publication Data

US 2015/0183317 A1    Jul. 2, 2015

(30) Foreign Application Priority Data

Dec. 30, 2013 (KR) .......................... 10-2013-166424

(51) Int. Cl.
| | | |
|---|---|---|
| *B62D 21/00* | (2006.01) | |
| *B60K 15/07* | (2006.01) | |
| *B60K 15/067* | (2006.01) | |
| *B60G 7/02* | (2006.01) | |
| *B60K 13/04* | (2006.01) | |
| *B60K 15/03* | (2006.01) | |
| *B60K 15/063* | (2006.01) | |

(52) U.S. Cl.
CPC ............... *B60K 15/07* (2013.01); *B60K 15/067* (2013.01); *B60G 7/02* (2013.01); *B60K 13/04* (2013.01); *B60K 2015/03118* (2013.01); *B60K 2015/03315* (2013.01); *B60K 2015/0634* (2013.01); *B60K 2015/0638* (2013.01)

(58) Field of Classification Search
CPC ...... B60K 15/03; B60K 15/063; B60K 15/07; B60K 15/067; B60K 2015/03118; B60K 2015/03315; B60K 2015/0631; B60K 2015/0634; B60K 2015/0636; B60K 2015/0638; B62D 25/20; B62D 25/2027; B62D 21/00; B62D 21/11; B62D 21/16; B62D 21/17
USPC .......... 180/309, 311, 314, 296; 280/830, 781, 280/788
See application file for complete search history.

(56) References Cited

U.S. PATENT DOCUMENTS

| | | | | |
|---|---|---|---|---|
| 5,673,939 | A * | 10/1997 | Bees et al. ..................... | 280/831 |
| 5,813,491 | A * | 9/1998 | Sato ..................... | B60K 15/063 |
| | | | | 180/309 |
| 6,557,596 | B2 * | 5/2003 | Ono et al. .................. | 141/311 A |
| 6,672,620 | B2 * | 1/2004 | Kawazu et al. ............... | 280/834 |
| 6,692,028 | B2 * | 2/2004 | Koster .......................... | 280/830 |
| 6,824,168 | B2 * | 11/2004 | Kawazu et al. ............... | 280/834 |
| 6,953,099 | B2 * | 10/2005 | Kawasaki et al. ............ | 180/65.1 |

(Continued)

FOREIGN PATENT DOCUMENTS

| | | |
|---|---|---|
| JP | 2003-72398 A | 3/2003 |
| JP | 2003-285655 A | 10/2003 |
| KR | 10-2008-0043900 A | 5/2008 |

*Primary Examiner* — James M Dolak
(74) *Attorney, Agent, or Firm* — Morgan, Lewis & Bockius LLP (57) ABSTRACT

A modularized structure of a fuel device and a rear suspension mounted on a floor panel of a vehicle that uses hydrogen or electricity as fuel, may include a cross member that is coupled to the fuel device and is disposed in a vehicle width direction, both ends thereof being connected to support a wheel hub, respectively, wherein the cross member is mounted to the floor panel in a state of being fastened to the fuel device in advance.

3 Claims, 6 Drawing Sheets

(56) References Cited

U.S. PATENT DOCUMENTS

| | | |
|---|---|---|
| 6,983,945 B2 * | 1/2006 | Kawasaki et al. ............. 280/834 |
| 7,040,432 B2 * | 5/2006 | Kawasaki et al. ............. 180/65.1 |
| 7,198,301 B2 | 4/2007 | Wozniak et al. |
| 7,264,277 B2 * | 9/2007 | Ono et al. ...................... 280/830 |
| 7,270,209 B2 * | 9/2007 | Suess ........................... 180/69.5 |
| 7,363,997 B2 * | 4/2008 | Sato et al. .................. 180/65.31 |
| 7,481,411 B2 * | 1/2009 | Jang ............................... 248/610 |
| 7,513,329 B2 * | 4/2009 | Nakashima et al. ........... 180/312 |
| 7,614,473 B2 * | 11/2009 | Ono et al. ..................... 180/299 |
| 7,694,778 B2 * | 4/2010 | Toyoshima et al. ........... 181/268 |
| 7,770,679 B2 * | 8/2010 | Takaku et al. ................ 180/68.5 |
| 8,220,808 B2 * | 7/2012 | Kim ....................... 280/124.107 |
| 8,230,883 B2 | 7/2012 | Takeshita et al. |
| 8,366,152 B2 * | 2/2013 | Tsubokawa ................... 280/834 |
| 8,465,057 B2 * | 6/2013 | Dandalides et al. .......... 280/831 |
| 8,522,910 B2 * | 9/2013 | Asai .............................. 180/309 |
| 8,672,359 B2 * | 3/2014 | Ohashi .......................... 280/834 |
| 8,864,175 B2 * | 10/2014 | Dandalides et al. .......... 280/831 |
| 8,944,469 B2 * | 2/2015 | Mulanon ....................... 280/834 |
| 8,978,617 B2 * | 3/2015 | Matsuda .............. B60K 15/063 123/198 E |
| 9,061,583 B2 * | 6/2015 | Dandalides et al. |
| 9,174,531 B2 * | 11/2015 | Finck ................... B60K 15/063 |
| 9,180,777 B2 * | 11/2015 | Dandalides .......... B60K 15/063 |
| 2004/0108677 A1 * | 6/2004 | Sekiguchi ............. 280/124.109 |

* cited by examiner

FASTENING TO THE FLOOR PANEL

FASTENING TO THE CROSS MEMBER

FIG. 5

MODULARIZED STRUCTURE OF FUEL DEVICE AND REAR SUSPENSION

CROSS-REFERENCE TO RELATED APPLICATION

The present application claims priority to Korean Patent Application No. 10-2013-166424 filed on Dec. 30, 2013, the entire contents of which is incorporated herein for all purposes by this reference.

BACKGROUND OF THE INVENTION

1. Field of the Invention

The present invention relates to a modularized structure of a rear suspension, and more particularly, to a modularized structure of a rear suspension of a hydrogen vehicle (a vehicle using hydrogen as fuel) in which two hydrogen tanks are mounted at the bottom of a floor panel or a vehicle using a battery pack as a fuel device, the modularized structure of the rear suspension being invented so that the rear suspension can be constituted by a multi-link type, instead of a conventional CTBA (Coupled Torsion Beam Axle) type, the number of modules to be assembled can be reduced to further enhance efficiency of an assembly process, and durability and NVH (Noise, vibration, and harshness) performance can be further improved.

2. Description of Related Art

Eco-friendly cars (hydrogen vehicles, electric cars, HEV and the like) which recently have been actively developed are equipped with a fuel system of another form such as a hydrogen tank and a battery pack, unlike general vehicles that use gasoline and diesel as fuel.

Typically, such a fuel system is placed near the rear suspension on a rear side of the vehicle, but the fuel system occupies a volume greater than that of the fuel tank of gasoline and diesel vehicles (in order to secure the same cruising distance as general vehicles) and may have a greater weight.

In response to this reason, the fuel system of the eco-friendly car is not directly mounted on the car body but is mounted on the vehicle body after a separate vehicle body mounting frame is coupled to the fuel system.

At the same time, in addition to the fuel system, an exhaust system similar to a vehicle using the fossil fuel is located near the suspension of the rear wheel. The exhaust system of the hydrogen vehicle in the eco-friendly cars is configured to discharge water vapor (pure water) that is generated when producing electricity by reaction of hydrogen.

Figure 1A:
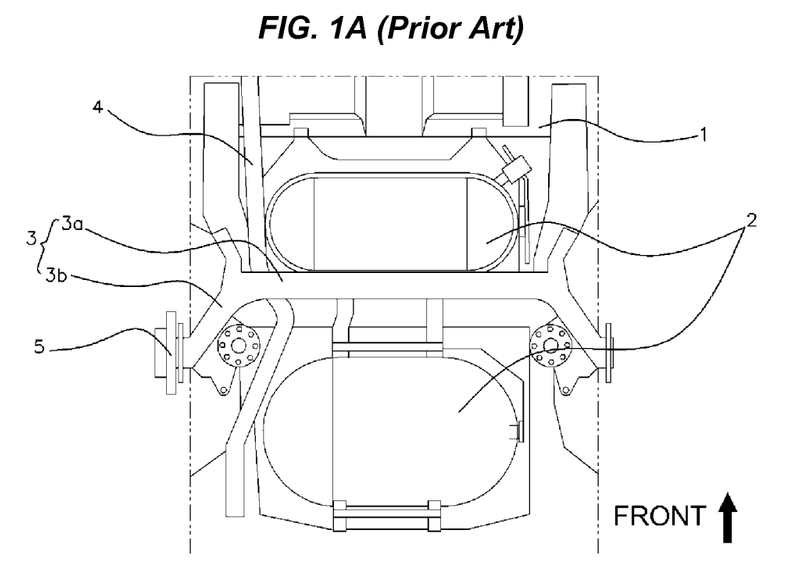
FIG. 1A is a bottom view showing an aspect in which a conventional CTBA suspension, hydrogen tanks, and an exhaust pipe are mounted under a floor panel of a vehicle body.

FIG. 1A is a bottom view shown an aspect in which two hydrogen tanks 2, a rear suspension, and an exhaust pipe 4 (that are major components of the fuel system) are mounted at the bottom of a floor panel 1 of the hydrogen vehicle.

As shown in FIG. 1A, in the case of the hydrogen vehicle, as two hydrogen tanks 2 having great volume are mounted, restriction conditions may have occurred in adopting the rear suspension. That is, since the hydrogen tanks 2 occupy the space to the vicinity of the rear wheel, a mounting space of the rear suspension for buffering the impact of the rear wheel is limited depending on placement and size of the hydrogen tanks 2. Thus, the suspension of a CTBA type is being applied in place of the suspension of the multi-link type requiring the relatively large mounting space.

The CTBA suspension system 3 is a type in which a torsion beam 3a with trailing arms 3b each joined at both ends is arranged in a vehicle width direction, and is connected to a wheel hub 5 connected to the rear wheel, and has advantages in that the weight of the car is relatively reduced, fuel consumption is improved, and, mounting space is reduced, it is possible to increase a loading space due to a decrease in the mounting space, and it is possible to secure safety at the time of rear collision. However, there has been a problem in that the performance of ride comfort and handling of the CTBA suspension system 3 falls short of the suspension of the multi-link type due to its structural limitations, and it is difficult to be applied to, especially, a vehicle having a high weight.

Figure 1B:
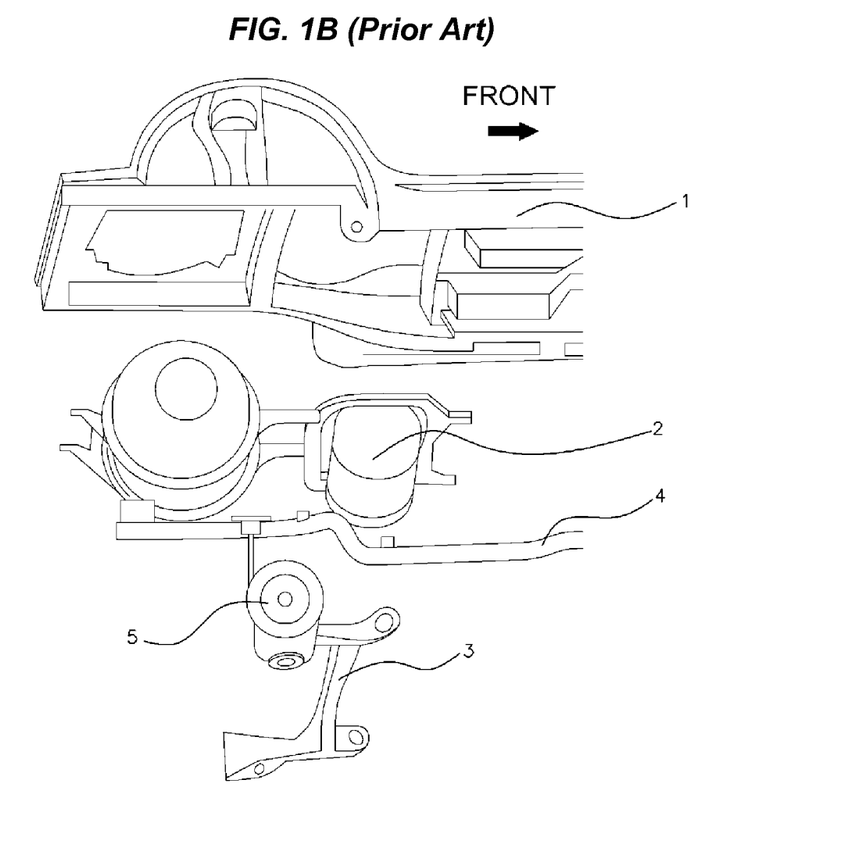
FIG. 1B is a diagram showing an aspect in which the hydrogen tanks, the exhaust pipe, and the CTBA suspension are sequentially mounted under the floor panel according to a conventional assembling procedure.

At the same time, as shown in FIG. 1B, the conventional assembly structure proceeds so that after the hydrogen tanks 2 are assembled to the bottom of the floor panel 1 in advance, the exhaust pipe 4 and the CTBA suspension 3 are sequentially fastened. Such an assembly process has had a structure in which multiple modules having the large size are independently mounted to the floor panel 1, and has had a problem in that the process becomes complicated, productivity and assembly quality decline during mass production, and the production costs can be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a modularized structure of the rear suspension (for electric cars, hydrogen cars or HEV vehicles) that is able to adopt a rear suspension of a multi-link type capable of providing the improved ride comfort and handling performance in place of the CTBA suspension to be able to solve the above-described problems, and is able to simplify the assembly process, thereby further improving the productivity and the assembly quality.

In an aspect of the present invention, a modularized structure of a fuel device and a rear suspension mounted on a floor panel of a vehicle that uses hydrogen or electricity as fuel, may include a cross member that is coupled to the fuel device and is disposed in a vehicle width direction, both ends thereof being connected to support a wheel hub, respectively, wherein the cross member is mounted to the floor panel in a state of being fastened to the fuel device in advance.

The fuel devices are two hydrogen tanks disposed below the floor panel to be spaced apart along a front-to-back direction, and the cross member is disposed in the vehicle width direction to cross between the hydrogen tanks.

The modularized structure of the rear suspension may further include an exhaust pipe which is disposed to extend from a front side to a rear side of the floor panel and is formed in a bent shape to pass between the hydrogen tanks, wherein the exhaust pipe is mounted to the floor panel in a state of being fastened to the cross member in advance.

The hydrogen tanks are coupled to a frame and mounted to the floor panel, the frame has a connecting portion crossing the cross member to interconnect the hydrogen tanks, and the connecting portion is fastened to the cross member.

Multiple bolt holes are punched through the frame to be fastened with bolts, a part of the bolt holes is fastened to the cross member with a part of the bolts, and remaining bolt holes are fastened to the floor panel with remaining bolts.

The frame includes an annular portion in which the hydrogen tanks are enclosed inside, and both ends of the cross member is formed in a curved shape to be additionally connected to an annular frame.

Since the cross member is mounted to the floor panel in advance in a state of being fastened with the hydrogen tanks and the exhaust pipe, the present invention configured as described above has an advantage of being able to shorten the assembly process.

At the same time, since the cross member of the present invention is connected to the wheel hub through arms (that is, a lower arm or an upper arm in which one side is connected to the wheel hub and the other side is connected to the vehicle body to support the behavior of the wheel hub) constituting the rear suspension by being mounted to the floor panel constituting the vehicle body between the hydrogen tanks, there is an effect of being able to form the rear suspension in the multi-link type.

In the exemplary embodiment of the present invention, since the frame which has mounted only the hydrogen tank on the floor panel further supports the cross member, a load input from a side direction of the wheels can be distributed at each point in which the frame is mounted as well as the cross member, there is an advantage of being able to further improve the running performance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of a door outside handle for vehicle according to an exemplary embodiment of the present invention will be described hereafter in detail with reference to the accompanying drawings.

Hereinafter, a modularized structure of a rear suspension according to a preferred exemplary embodiment of the present invention will be described in more detail with reference to the drawings.

Figure 2:
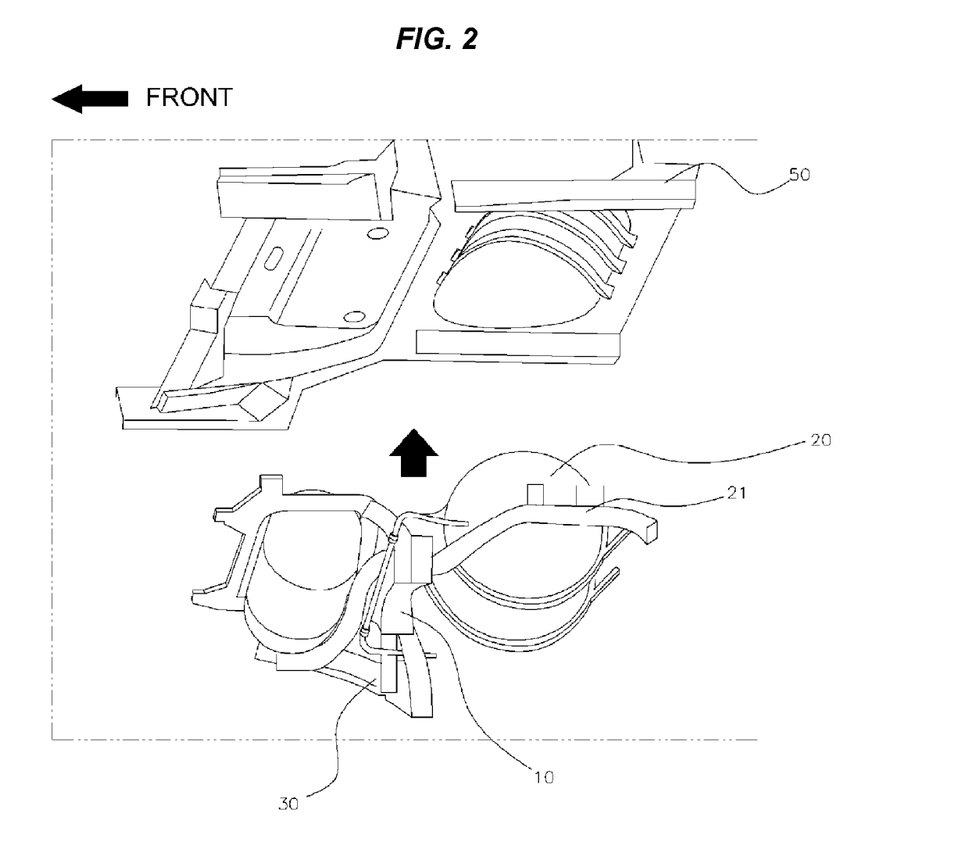
FIG. 2 is a diagram showing an aspect in which a cross member is integrally mounted under the floor panel in a state of being fastened to the hydrogen tanks, the exhaust pipe, and the suspension arm in advance according to a preferred exemplary embodiment of the present invention.

The present invention is a modularized structure of a rear suspension in which two hydrogen tanks 20 are mounted at the bottom of a floor panel 50 to be disposed spaced apart along a front-to-back direction, the modularized structure includes a cross member 10, and the cross members 10, the hydrogen tanks 20, and the exhaust pipe 40 are integrally mounted to the floor panel 50 in a state of being fastened in advance, as shown in FIG. 2.

Figure 3:
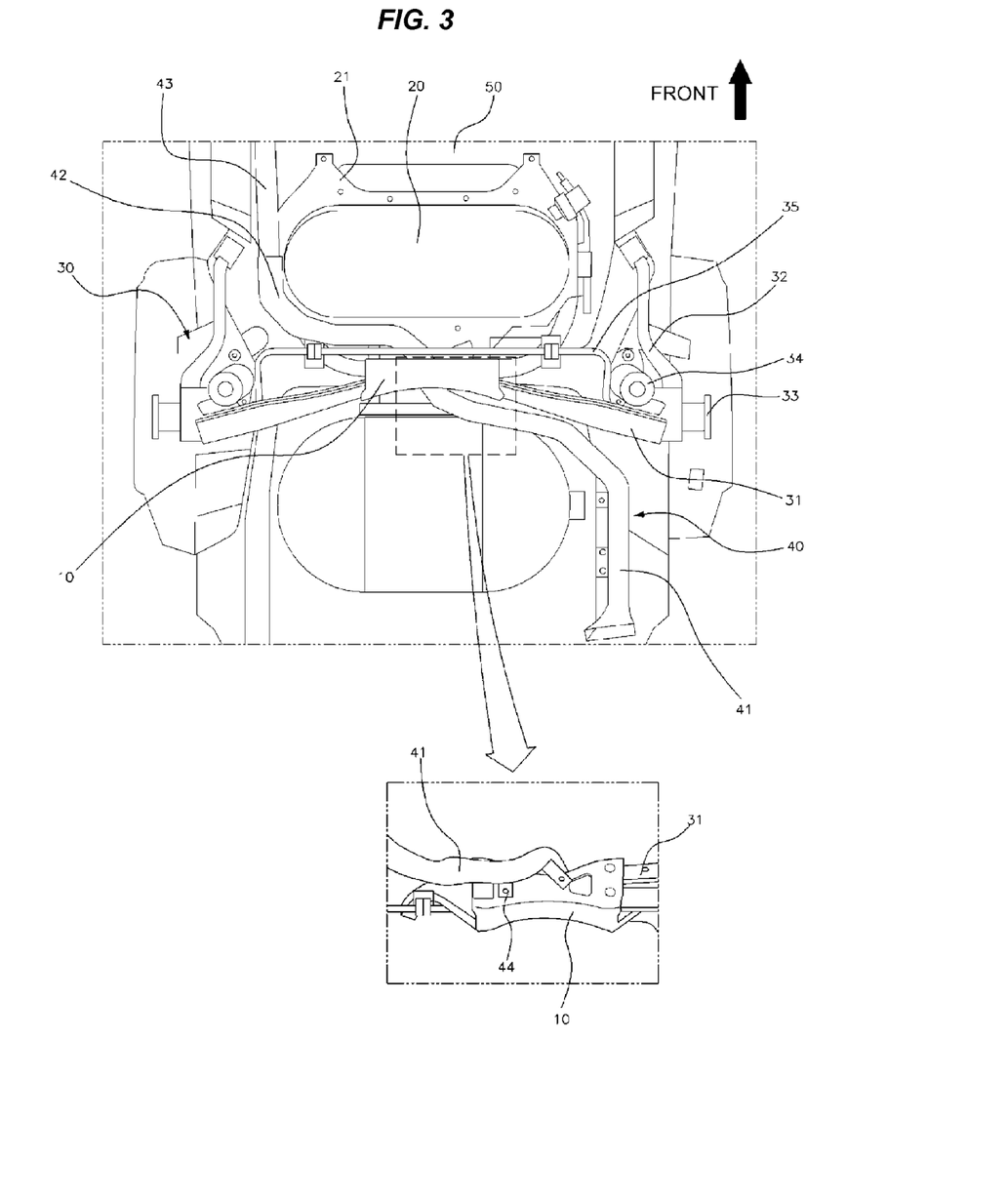
FIG. 3 is a diagram showing a bottom view illustrating an aspect in which the cross member, the hydrogen tanks, the exhaust pipe, and the suspension arm are mounted under the floor panel, and a side view illustrating an aspect in which the exhaust pipe, the cross member, and the lower arm is coupled.

As is more clearly shown in FIG. 3, the cross member 10 is disposed in a vehicle width direction to cross between two hydrogen tank 20 disposed in the front-to-back direction. Moreover, the cross member 10 is connected to the wheel hub 33 at both ends through the arms which constitute a multi-link suspension 30.

For reference, in the multi-link suspension applied to the structure shown in FIG. 3, the behavior in the lateral direction of the wheel hub 33 is connected to be supported through a lower arm 31 for connecting the cross member 10 and the wheel hub 33 and an upper arm (that connects the wheel hub to the cross member or another sub-frame mounted on the vehicle body), the behavior in the front-to-rear direction of the wheel hub 33 is supported via a trailing arm 32 disposed at the front of the wheel hub 33, and the behavior in the vertical direction of the wheel hub 33 is buffered via a shock absorber 34. At the same time, the cross member 10 of the present invention is coupled so that a stabilizer bar 35 connected to both lower arms 31 to support the rolling of the vehicle body can be seated.

Meanwhile, in the structure of the present invention, the exhaust pipe 40 (that discharges water vapor or water generated after hydrogen reaction) is fixed and mounted to the cross member 10. The exhaust pipe 40 is disposed to be connected to the rear part from the front part of the floor panel 50, and is formed in a curved shape to pass between the hydrogen tanks 20. In order to have such a structure, the exhaust pipe 40 is configured to include a front side pipe 43 of a straight shape, a rear side pipe 41 having a shape curved to be fixed over the cross member 10, and a tube 42 made of a material having flexibility.

A bracket 44 capable of being tightened with bolts is joined to the rear side pipes 41, and is coupled to the cross member 10 by bolting fastening, and the tube 42 is fastened to each of the front side and rear side pipes 41 and 43 through known clamps or the like.

In the structure according to an exemplary embodiment of the present invention, in a state in which the lower arm 31 is fastened to the cross member 10 (more particularly, a state in which the respective components of the rear suspension are connected to the cross member in a state of being connected and modularized state), coupling to the rear side pipe 43 and each of the hydrogen tanks 20 is performed, and when mounting to the floor panel 50 is performed in an integrally coupled state (of the rear suspension module and a rear side pipe to the cross member), the rear side pipe 41 is connected the front side pipe 43 through the tube 42.

Figure 4:
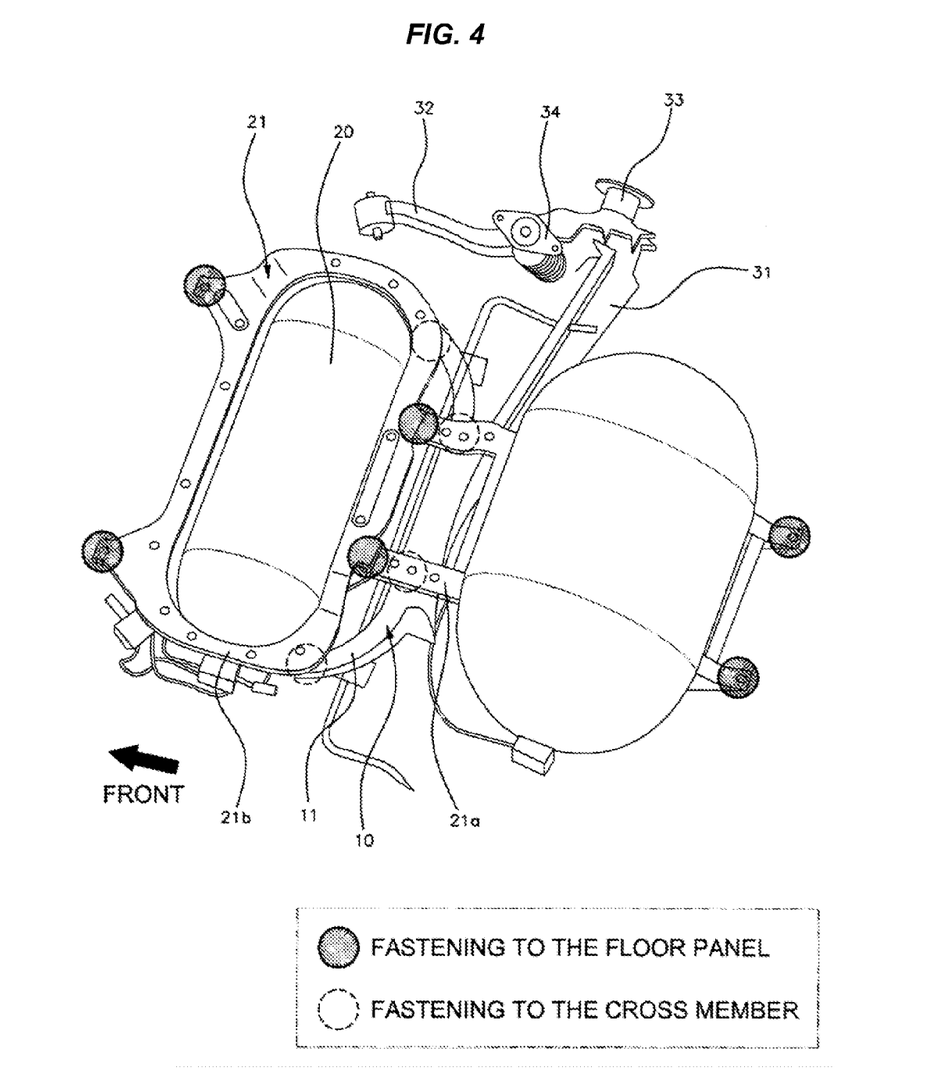
FIG. 4 is a diagram showing a point where the frame fastened to the hydrogen tanks is coupled to the vehicle body and a point where the frame and the cross member are coupled.

At the same time, as shown in FIG. 4, the hydrogen tanks 20 of the present invention are coupled to the frame 21 and are mounted to the floor panel 50, the frame 21 has a connecting portion 21a that crosses the cross member to connect the hydrogen tanks 20 with each other, and the connecting portion 21a is bolting-fastened to the cross member 10 (or by welding or the like).

Moreover, multiple bolt holes (at points indicated by circles in FIG. 4) are punched through the frame 21 to be able to be fastened with the bolts, a part of the bolt holes is fastened to the cross member 10 with bolts (four points in FIG. 4), and the remainder (six points in FIG. 4) is fastened to the floor panel 50 with bolts.

Furthermore, in the structure of the present invention, the frame 21 includes an annular portion 21b that contains the hydrogen tanks 20 inside, both ends of the cross members have a curved portion 11 that is formed in a bent shape to be able to be further connected to the annular portion 21b.

In an exemplary embodiment of the present invention, since there is no need for a separate mounting device for mounting the cross member 10 on the floor panel 50 by having the fastening structure as described above, it is possible to reduce the size and weight of the cross members 10.

At the same time, since the cross member 10 of the present invention has a structure fastened to the frame 21 for supporting the hydrogen tanks 20, the frame 21 is able to share the load transmitted to the cross member 10.

Figure 5:
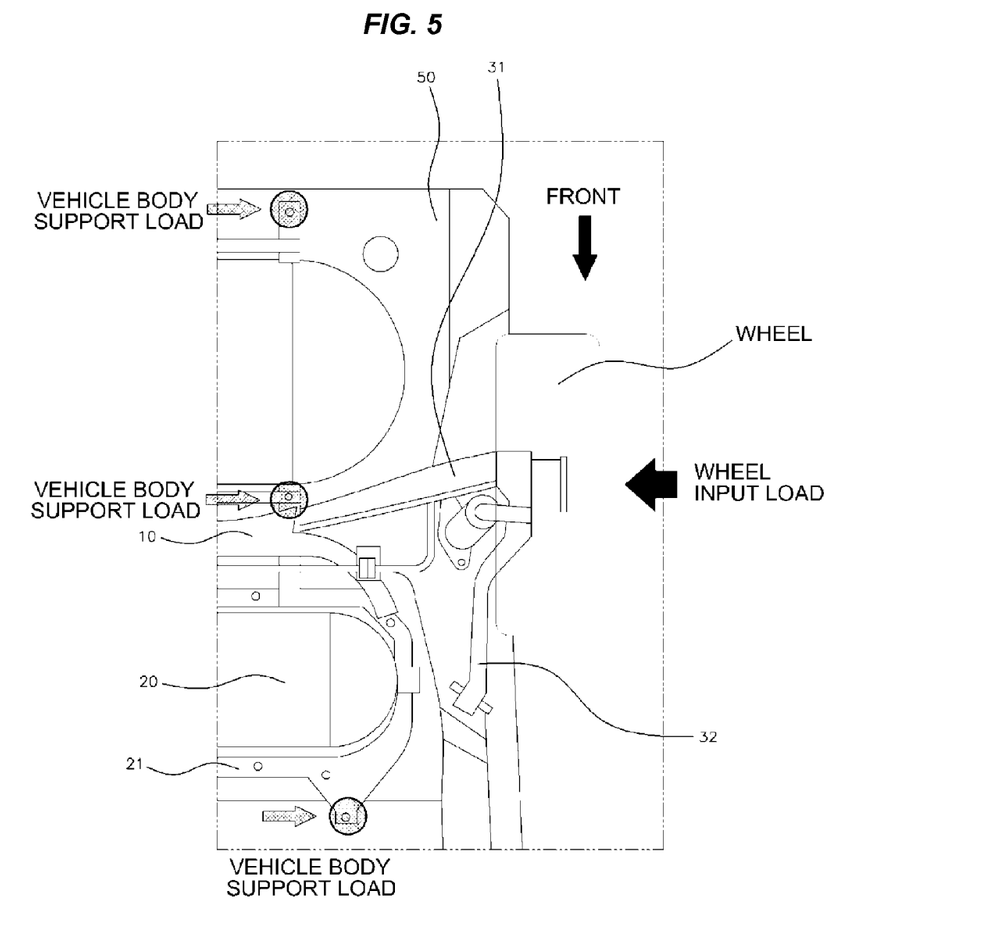
FIG. 5 is a diagram showing an aspect in which load is distributed and supported to the frame coupled to the cross member when lateral load is applied to the rear wheel in accordance with driving of the vehicle.

That is, as shown in FIG. 5, load input to the rear wheel is transmitted to the cross member 10 through the wheel hub and the lower arm 31, and by having a structure in which the cross member 10 is fastened to the floor panel 50 through the frame 21, the wheel input load is shared and supported at each of the points where the frame 21 is fastened to the floor panel 50.

Since the present invention configured as described above can reduce the number of modules to be assembled under the floor panel 50 (from three to one as compared to the conventional structure), there is an effect of being able simply configure the assembly process. Thus, it is possible to improve productivity, assembling properties, and assembly quality and to reduce the production costs.

Furthermore, as the frame 21 for fastening the hydrogen tank 20 to the floor panel 50 is fixedly fastened to the cross members 10, since it is possible to obtain an effect of extending a vehicle body mounting span of the cross member 10, it is possible to disperse the load inputted to the wheel and transmitted to the vehicle body, thereby improving the durability performance and the NVH performance.

Further, by having a structure in which the cross member 10 is mounted to the frame 21, since there is no need for a separate bracket or mounting device (for mounting the cross member on the floor panel), it is possible to reduce the size and weight of the cross member.

Meanwhile, the modularized structure of the rear suspension of the present invention can also be applied to vehicles (such as electric vehicles, and HEV) that use a battery pack instead of the hydrogen tank. That is, the present invention can also be applied to various echo-friendly cars in which a battery pack is mounted as a fuel device (only electricity is used as fuel, or both electricity and fossil fuel are used as fuel) under the floor panel (mounting is performed in a manner similar to the hydrogen tank) instead of the hydrogen tank, without using gasoline or diesel as fuel.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A modularized structure of a fuel device and a rear suspension mounted on a floor panel of a vehicle that uses hydrogen or electricity as fuel, and the modularized structure comprises:
    a cross member coupled to the fuel device and disposed in a vehicle width direction, both ends thereof being connected to support a wheel hub, respectively,
    an exhaust pipe disposed to extend from a front side to a rear side of the floor panel and formed in a bent shape to pass between separate hydrogen tanks,
    wherein the hydrogen tanks are connected to a frame and mounted to the floor panel, the frame has a connecting portion crossing the cross member to interconnect the hydrogen tanks, and the connecting portion is fastened to the cross member,
    wherein the frame includes an annular portion in which the hydrogen tanks are enclosed inside, and both ends of the cross member is formed in a curved "C" shape to be additionally connected to the annular portion,
    wherein the exhaust pipe is configured to include a front side pipe of a straight shape, a rear side pipe having a "L" shape curved to be fixed over the cross member, and a tube connecting to each of the front side and rear side pipes, and
    wherein the cross member is mounted to the frame in a state of being fastened to the suspension and the rear side pipe in advance.

2. The modularized structure of the fuel device and the rear suspension of claim 1, wherein the fuel devices are two hydrogen tanks disposed below the floor panel to be spaced apart along a front-to-back direction, and the cross member is disposed in the vehicle width direction to cross between the hydrogen tanks.

3. The modularized structure of the fuel device and the rear suspension of claim 1, wherein multiple bolt holes are punched through the frame to be fastened with bolts, a part of the bolt holes is fastened to the cross member with a part of the bolts, and remaining bolt holes are fastened to the floor panel with remaining bolts.

* * * * *